United States Patent [19]
Buchan et al.

[11] Patent Number: 5,255,130
[45] Date of Patent: Oct. 19, 1993

[54] ADJUSTABLE WRITE EQUALIZATION FOR TAPE DRIVES

[75] Inventors: William A. Buchan; Gregory A. Unruh, both of San Clemente, Calif.; Yinyi Lin, Chuang Hua, Taiwan

[73] Assignee: Archive Corporation, Costa Mesa, Calif.

[21] Appl. No.: 678,086

[22] Filed: Mar. 29, 1991

[51] Int. Cl.$^5$ .................. G11B 20/14; H03K 3/017; H03K 5/06
[52] U.S. Cl. .................................. 360/41; 360/46; 307/265
[58] Field of Search .................. 360/39, 40, 41, 44, 360/46, 48, 51; 307/265, 266, 267

[56] References Cited

U.S. PATENT DOCUMENTS 5,166,836 11/1992 Choi ........................... 360/41

OTHER PUBLICATIONS

"Write equalization in high-linear-density magnetic recording," Schneider, IBM J. Res. Develop., vol. 29, No. 6, Nov. 1985, pp. 563-556.
"Write Equalization For Generalized (d,k) Codes," Schneider, IEEE Transactions On Magnetics, vol. 24, No. 6, pp. 2533-2535, 1988 (No Month).
"Serial Recorded Magnetic Tape Cartridge For Information Interchange", QIC-1350, Revision H, Quarter-Inch Cartridge Drive Standards, Inc., Aug. 21, 1990 (all pages).

*Primary Examiner*—David Mis
*Attorney, Agent, or Firm*—Roberts and Quiogue

[57] ABSTRACT

A write equalization circuit that includes a data encoder for producing a binary data signal wherein a 1 is represented by a transition at the start of a bit interval and a 0 is represented by no transition at the start of a bit interval, an equalization timing generator for generating a start signal indicative of the initial edges of equalization pulses for predetermined 0's in the binary data signal, and a multiple stage delay delay circuit having logic gates implemented in an integrated circuit and responsive to the start signal and a control word for providing equalization pulses of a substantially constant width, wherein the number of stages employed for delay is determined by the control word. Logic circuitry implemented in the same integrated circuit as the multiple stage delay circuit detects changes in the propagation delay characteristics of the logic gates of the multiple stage delay circuit, and a processor responsive to the logic circuitry adjusts the control word so as to maintain the width of the equalization pulses substantially constant. Also disclosed is a method for adjusting write equalization pulses in a tape drive to achieve a desired suppression in the read signal.

14 Claims, 6 Drawing Sheets

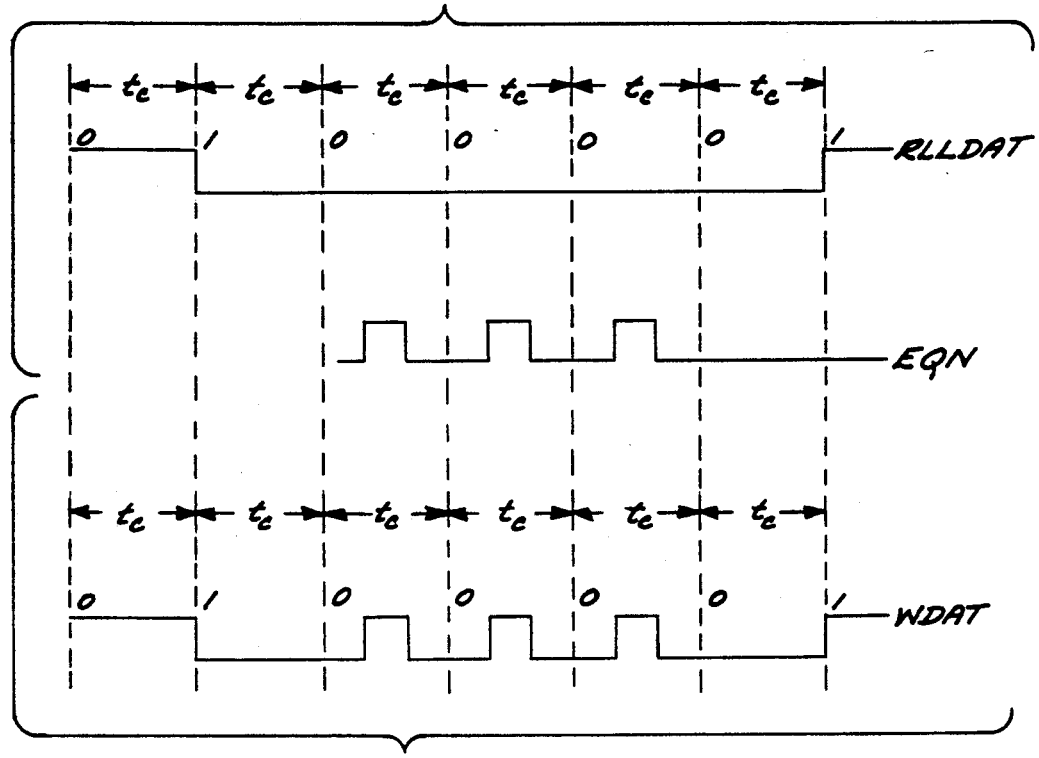
FIG. 2
FIG. 3
FIG. 4
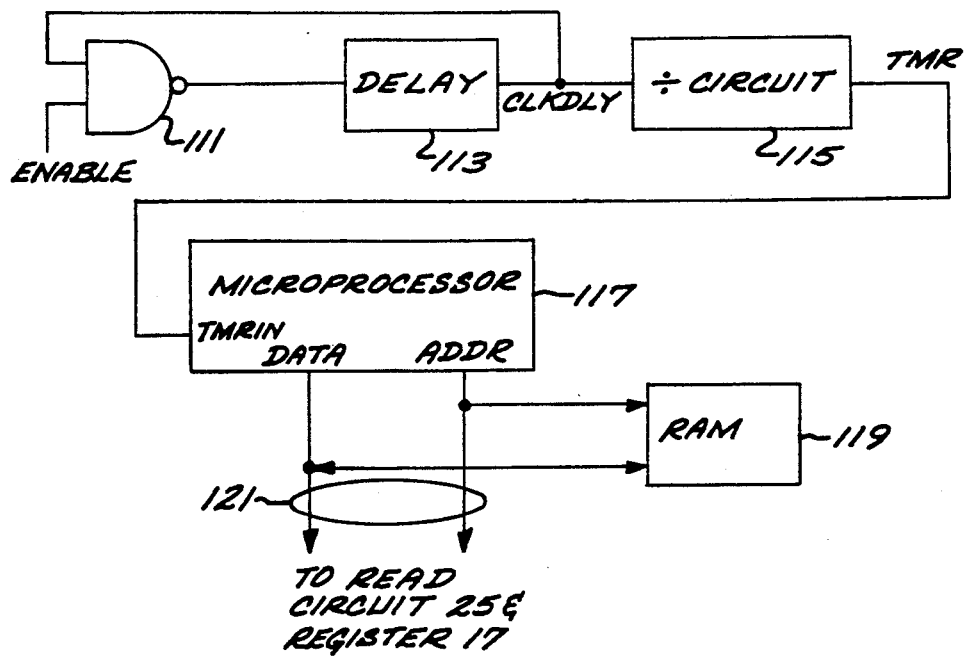

000# ADJUSTABLE WRITE EQUALIZATION FOR TAPE DRIVES

BACKGROUND OF THE INVENTION

The subject invention is directed generally to computer data tape drives, and is directed more particularly to adjustable write equalization for computer data tape drives.

Computer data tape drives have been utilized for many years in the computer environment for "secondary" storage by which computer data on "primary" data storage, such as magnetic disk systems, could be periodically backed up or transported.

In the continuing quest for higher data densities, various coding techniques, recording techniques, and writing techniques have been developed over the years. Such developments have included write equalization for NRZI (non-return to zero, invert on ones) recording. Pursuant to NRZI recording, a binary 1 is written to tape pursuant to a transition in the write current level which causes a flux reversal, while a binary 0 is "written" by no transition in the write current level. The premise of NRZI is that data bits are supposed to be written at equally spaced intervals on tape, physically and in time.

As is well known, NRZI recording is typically implemented with run length limited (RLL) coding which limits the number of 0's that can occur in succession. Run length limited coding is generally depicted as RLL (d,k) coding, wherein k represents the maximum number of successive 0's permitted and d represents the minimum number of 0's between 1's and can have a value of 0. Thus, RLL codes having values of k that are relatively larger than d will have large transition spacing ratios (i.e., the ratio between the shortest and longest spaces between transitions). As is well known, relatively large transition ratios create various problems especially for the read circuitry, including for example saturation of magneto resistive read elements due to high values of low frequency flux.

A significant approach to solving the foregoing problems is the addition of equalization pulses to the write current during occurrences of strings of 0's, as described in "Write equalization in high-linear-density magnetic recording," Schneider, IBM J. RES. DEVELOP., Vol. 29, No. 6, November 1985, pages 563-568; "WRITE EQUALIZATION FOR GENERALIZED (d,k) CODES," Schneider, IEEE TRANSACTIONS ON MAGNETICS, Vol. 24, No. 6, pages 2533-2535, 1988; and the QIC-1350 Development Standard of the Quarter-Inch Cartridge Drive Standards, Inc. for SERIAL RECORDED MAGNETIC TAPE CARTRIDGE FOR INFORMATION INTERCHANGE.

The QIC-1350 Development Standard specifies that for every 0 other than the first 0 following a 1, a write equalization pulse is inserted. The width $t_w$ of the equalization pulse is specified to be 1/6 of the minimum nominal transition period $t_c$ ($\pm 5\%$), where the transition period is the time between two adjacent flux transitions at the maximum recording density (i.e., the minimum time between the flux transitions as allowed by the particular RLL coding utilized). The QIC-1350 Development Standard utilizes RLL (1,7) coding, and therefore the width of the equalization pulse is ⅙ of the nominal bit interval since the minimum time between flux transitions includes 2 bit intervals. In particular, the equalization pulse width is 35.8 nanoseconds.

Typically, the write equalization pulses have been produced by inserting pulses of the specified width in the write current. However, as a result of non-linear distortions due to inadequate write current or head field rise times, demagnetization field effects from a prior transition, spacing loss, as well as other factors such as write head, write circuit, and tape variations, the equalization pulses recorded on tape are actually narrower than the specified pulse width, and the suppression of low frequency components recorded on tape as specified by the write equalization specification is not being achieved. Tapes having insufficiently suppressed low frequency components may be unreadable since the effective resolution of the read head is inadequate.

Circuitry for producing the write equalization pulses are commonly implemented with integrated circuits, and factors that affect the accuracy of the narrow equalization pulse width include processing variations as well as voltage and temperature effects. As a result of these factors, the equalization pulse width produced by a particular circuit can easily be outside the tolerances specified for the equalization pulse width.

SUMMARY OF THE INVENTION

It would therefore be an advantage to provide a computer data tape drive write equalization circuit that is controlled to record write equalization pulses having the desired suppression.

Another advantage would be to provide a computer data tape drive write equalization circuit that is implemented with integrated circuits and compensates for integrated circuit processing variations as well as voltage and temperature effects.

The foregoing and other advantages are provided by the invention in a write equalization circuit that includes a data encoder for producing a binary data signal wherein a 1 is represented by a transition at the start of a bit interval and a 0 is represented by no transition at the start of a bit interval, an equalization timing generator for generating a start signal indicative of the initial edges of equalization pulses for predetermined 0's in the binary data signal, and a multiple stage delay delay circuit having logic gates implemented in an integrated circuit and responsive to the start signal and a control word for providing equalization pulses of a substantially constant width, wherein the number of stages employed for delay is determined by the control word. Logic circuitry implemented in the same integrated circuit as multiple stage delay circuit detects changes in the propagation delay characteristics of the logic gates of the multiple stage delay circuit, and a processor responsive to the logic circuitry adjusts the control word so as to maintain the width of the equalization pulses substantially constant.

A further aspect of the invention is directed to a method for adjusting write equalization pulses in a tape drive that includes (i) an equalization pulse generating circuit having a variable delay circuit that includes logic gates, (ii) a read amplifier, and (iii) a read circuit time domain filter. The method includes the steps of (a) setting the threshold of the time domain filter at a predetermined level, (b) writing a predetermined RLL test pattern containing 1's separated by successive 0's without equalization pulses, (c) reading the recorded test pattern and reducing the gain of the read amplifier to a level that is slightly below the minimum amplifier gain level at which the time domain filter would detect a predetermined percentage of the recorded 1's, such percentage being less than 100%, (d) writing the predetermined RLL test pattern with equalization pulses having a predetermined pulse width, (e) reducing the threshold of the time domain filter by a predetermined amount, and (f) increasing the pulse width of the equalization pulses to a reference width slightly greater than the minimum pulse width which would cause detection of the predetermined percentage of the recorded 1's.

BRIEF DESCRIPTION OF THE DRAWINGS

The advantages and features of the disclosed invention will readily be appreciated by persons skilled art from the following detailed description when read in conjunction with the drawing wherein:

FIG. 2 schematically depicts waveforms of signals in the write equalization circuit of FIG. 1.

FIG. 3 schematically depicts a waveform of the write signal produced by the circuit of FIG. 1 which includes RLL data and equalization pulses.

FIG. 4 is a schematic block diagram of an illustrative example of an implementation of the calibration circuit of the write equalization circuit of FIG. 1.

DETAILED DESCRIPTION OF THE DISCLOSURE

Figure 1:
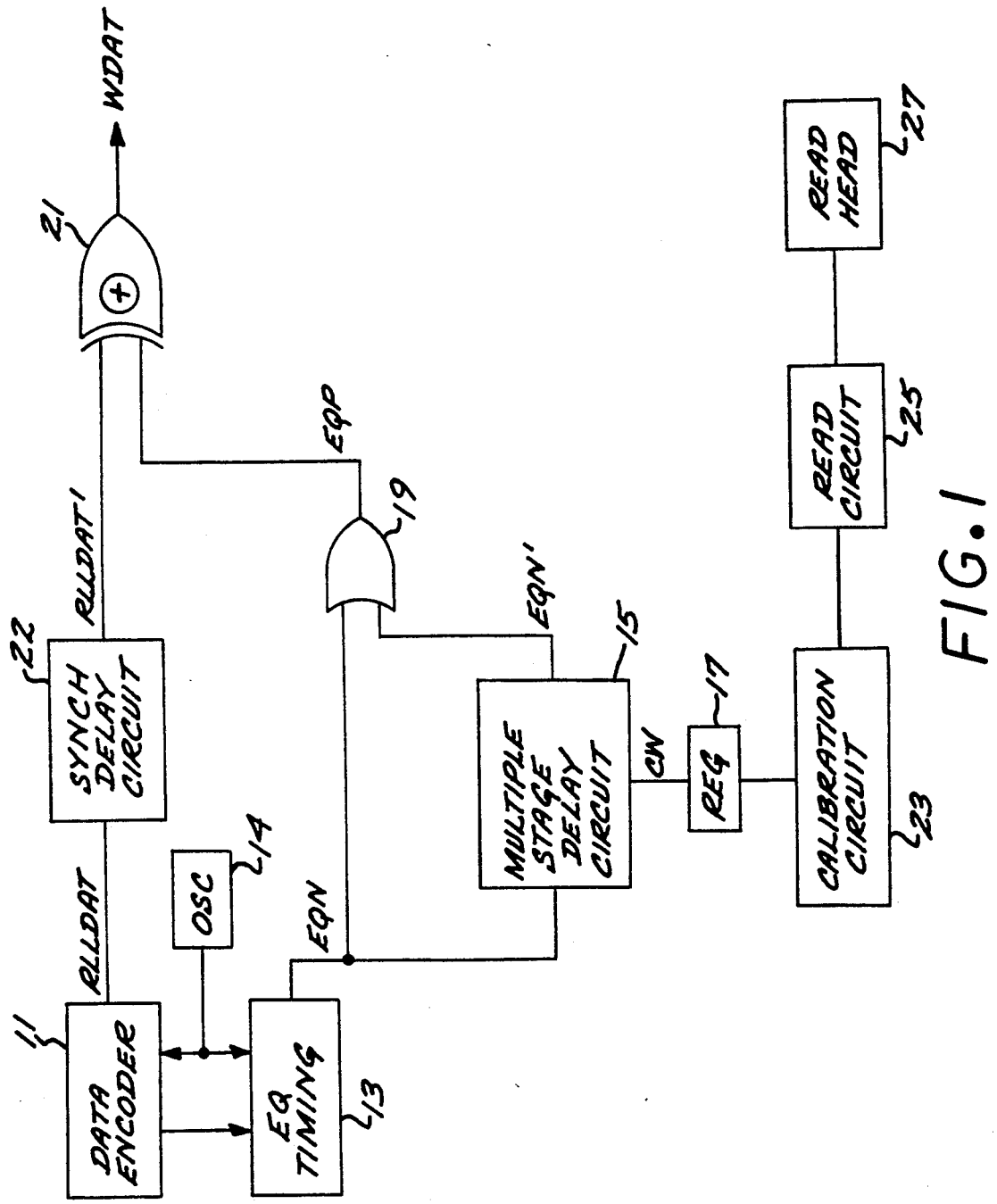
FIG. 1 is a block diagram of a write equalization circuit in accordance with the invention.

In the following detailed description and in the several figures of the drawing, like elements are identified with like reference numerals.

Referring now to FIG. 1, set forth therein is a write pulse equalization circuit that includes a data encoder 11 that encodes data to be written to tape into NRZI data in accordance with the RLL code utilized to provide a two level signal RLLDAT wherein a transition at the beginning of a bit interval represents a 1, and no transition a the beginning of a bit cell represents a 0. The top waveform in FIG. 2 represents the RLLDAT output of the data encoder 11 for the example of a valid data pattern of 01000010 for the code being used.

An equalization pulse timing circuit 13 provides a 2 level signal EQN containing nominal equalization pulses which are timed relative to the RLLDAT output in accordance with the particular equalization specification being implemented. For example, for the QIC-1350 Development STANDARD, an equalization pulse is provided for each 0 other than the last 0 preceding a 1, with the pulse being centered in the bit interval of the associated 0 and having a nominal width of $t_c/3$, where $t_c$ is the bit interval or period. The lower waveform in FIG. 2 represents the EQN output of the equalization pulse timing circuit 13 for the example data pattern 01000010 represented by the RLLDAT output represented by the waveform at the top of FIG. 2.

The data encoder 11 and the equalization timing circuit 13 are commonly clocked by the MCLK clock output of a crystal oscillator clock source 14. By way of illustrative example, the MCLK clock signal has a clock period equal to the nominal width of an equalization pulse $t_c/3$, which would provide synchronization between the equalization pulses and the bit intervals, each of which would be defined by three periods of the MCLK signal. Thus, each data transition of the RLLDAT signal and the transitions of the nominal equalization signal EQN would be defined by clock edges. As discussed further herein, the trailing edges of the equalization pulses that are combined with the RLLDAT signal can be stretched or extended so as to achieve the desired level of equalization.

The EQN signal output of the equalization timing circuit is provided to a multiple stage delay circuit 15 whose output EQN' is a delayed version of the EQN signal. By way of illustrative example, the multiple stage delay circuit 15 comprises a variable delay tree. The number of delay stages utilized to produce the delayed signal EQN' is determined by a control word CW in a control register 17.

The multiple stage delay circuit 15 is built from logic gates in an integrated circuit such that the total delay through the tree is:

$$\sum_{n=0}^{CW} d_n = CW \cdot d \quad \text{(Equation 1)}$$

where $d_n$ is the delay added by each additional gate n gated into the delay path. All respective delays $d_n$ can be implemented to be approximately equal, and each elemental delay $d_n$ can be described by the equation:

$$d_n = d_{n(nom)} \cdot K \quad \text{(Equation 2)}$$

Where $d_{n(nom)}$ is the delay of each delay gate under nominal process, temperature and voltage, and K is a factor which expresses the proportional change in delay for all gates within the same integrated circuit under actual present conditions of process, voltage and temperature. The total delay may be expressed, therefore, as:

$$\sum_{n=0}^{CW} d_{n(nom)} \cdot K = CW \cdot d_{(nom)} \cdot K \quad \text{(Equation 3)}$$

The EQN signal output of the equalization timing circuit is further provided to an OR circuit 19 which also receives the delayed version EQN' as an input. The output EQP of the OR circuit 19 includes equalization pulses the lengths of which are controlled by the delay provided by the multiple stage delay circuit, as determined by the value of the control word CW in the control register 17. In particular, the timing of the trailing edges relative to the respective leading edges is controlled by the multiple stage delay circuit 15 pursuant to the control word CW.

The EQP output of the OR circuit 19 is provided as one input to an EXCLUSIVE-OR circuit 21. The other input to the EXCLUSIVE-OR circuit 21 is provided by the output RLLDAT' of a synchronizing delay circuit 22 whose input is the RLLDAT signal from the data encoder 11. The synchronizing delay circuit 22 functions to appropriately delay the RLLDAT signal so that the delayed version RLLDAT' is appropriately synchronized with the EQP equalization pulses in accordance with the particular equalization standard being used. For example, for the QIC-1350 Development Standard the leading edge of the first equalization pulse starts at $1.5t_c$ after the preceding 1 transition and any subsequent equalization pulses start at $t_c$ intervals following the start of first equalization pulse, where $t_c$ is the bit interval. The WDAT output of the EXCLUSIVE-OR circuit 21 is a 2 level signal and is represented by the waveform in FIG. 3 for the example data pattern 01000010 represented by the RLLDAT output represented by the waveform at the top of FIG. 2.

In the foregoing, the equalization pulses of the EQP signal provided by the OR circuit 19 are of a predetermined polarity (e.g., positive wherein the leading edges are positive going), and the EXCLUSIVE-OR circuit 21 produces equalization pulses of the appropriate polarity for the particular level of the RLLDAT' that happens to represent successive 0's. Thus, if the RLLDAT' is low for certain successive 0's, the equalization pulses in WDAT will be positive going for those 0's. If RLLDAT' is high for certain successive 0's, the equalization pulses in WDAT will be negative going (i.e., negative going leading edges) for those 0's.

The value of the control word in the control register 17 is set by a calibration circuit 23. In particular, the calibration circuit 23 controls the number of delay stages utilized to produce the delayed signal EQN' to compensate for drift due to voltage and temperature variations so that widths of the EQP pulses remain substantially constant in the operation of the write equalization circuit, where the desired steady state constant pulse width value is initially determined by the calibration circuit in conjunction with a read circuit 25 that is responsive to a tape read head 27.

The calibration circuit 23 functions in an initial calibration mode to determine a reference control word $CW_o$ that produces the desired playback characteristics, such as a predetermined suppression of a fundamental component defined by the lowest frequency of transitions in the data written to tape. Such initial calibration can be performed pursuant to manufacture or whenever a tape is to be written, for example by writing test patterns to tape and varying the control word until the desired playback characteristics are achieved. Subsequently, for writing data to tape, the calibration circuit functions in a steady state mode wherein the reference control word $CW_o$ is utilized to arrive at the control word CW which varies with changes in propagation delay characteristics of the implementation of the delay circuit 15 due to temperature and voltage variations. In this manner, the EQP signal provides equalization pulses that remain substantially constant with variations in voltage and temperature for a given initial calibration.

Referring now to FIG. 4, set forth therein is a block diagram of an illustrative example of an implementation of the calibration circuit 23 which comprises an enable gate 111 and delay circuitry 113 constructed from a number of logic buffers connected in series and responsive to the enable gate 111 The output CLKDLY of the delay circuitry 113 is fed back to the enable gate 111 and comprises the frequency output of a ring oscillator formed by the enable gate 111 and the delay circuitry 113. The frequency output CLKDLY of the ring oscillator is provided to a divide circuit 115 whose output TMR is a reduced frequency version of CLKDLY. The divide circuit output TMR is provided to the counter input TMRIN of a microprocessor 117 which is configured to detect the frequency of the TMR signal. A random access memory 119 for data storage is accessed by the microprocessor 117 via address and data busses 121.

The enable gate 111 and the delay circuitry 113 forming a ring oscillator are implemented in the same integrated circuit as the variable stage delay circuit 15, for example in a gate array, so that such circuitry will have substantially the same propagation delay characteristics. The frequency of operation of the ring oscillator is a function of the process, voltage and temperature factors of the integrated circuit and therefore changes in the ring oscillator frequency provide an indication of drift in the voltage and temperature factors of the integrated circuit. Such changes in the ring oscillator frequency are utilized as follows to control the value of the control word CW that determines the number of enabled delay stages in the variable stage delay circuit 15.

The frequency of oscillation FR of the ring oscillator (111, 113) is:

$$FR = 1/(t_{rE} + t_{rD} + t_{fE} + t_{fD}) \quad \text{(Equation 4)}$$

Where $t_{rE}$ and $t_{fE}$ are the rise and fall delays of the enable gate 111, and $t_{rD}$ and $t_{fD}$ are the rise and fall delays of the delay circuit 113. Since these elements are implemented in the same integrated circuit as the multiple stage delay circuit 15, they are affected by the same factor K as the elements of the delay tree, so that:

$$FR = 1/(t_{rE(nom)} \cdot K + t_{rd(nom)} \cdot K + t_{fE(nom)} \cdot K + t_{fD(nom)} \cdot K) \quad \text{(Equation 5)}$$
$$= 1/K(t_{rE(nom)} + t_{rd(nom)} + t_{fE(nom)} + t_{fD(nom)}) \quad \text{(Equation 6)}$$

From Equation 6, the oscillation frequency $F_{nom}$ when all of the delays are nominal can be expressed as:

$$FR_{nom} = (t_{rE(nom)} + t_{rd(nom)} + t_{fE(nom)} + t_{fD(nom)}) \quad \text{(Equation 7)}$$

Substituting Equation 7 into Equation 6 provides the following expression for the oscillation frequency FR:

$$FR = FR_{nom}/K \quad \text{(Equation 8)}$$

The factor K applies equally to the elements of the delay tree and the ring oscillator, regardless of the exact type of gates used, even if each is implemented with a different type of gate. Care must be taken, however, when designing the IC so that very slow rise and fall times are not produced which can cause the delay elements not to follow this simple linear equation. Thus, changes in frequency can be measured by the microprocessor and used to adjust CW so that the equalization pulse width remains constant.

In operation, the ring oscillator is enabled by providing a LO enable signal for sufficient time to allow any LO states in the delay circuit to be removed, and then providing a HI enable signal which will cause the ring oscillator to oscillate.

The calibration circuit initially determines a control word reference value $CW_o$ that produces the desired equalization, such as a predetermined suppression in the lowest fundamental frequency which is determined by the lowest frequency of transitions for the particular RLL code implemented (i.e., maximum successive 0's). When the reference control word value is determined, the calibration circuit detects the frequency of operation of the ring oscillator which is stored as frequency reference $FR_o$. In steady state operation, the reference control word and the frequency reference value are utilized in conjunction with the actual ring oscillator frequency to adjust the control word CW. An illustrative example of an initial calibration procedure will be described further below.

Essentially, the calibration circuit indirectly detects changes in the propagation delay characteristics of the multiple stage delay circuit by directly detecting changes in the propagation delay characteristics of the delay circuit of the ring oscillator, and changes the number of enabled delay stages in the multiple stage delay circuit in order to compensate for the changes in the propagation delay characteristics.

Figure 5:
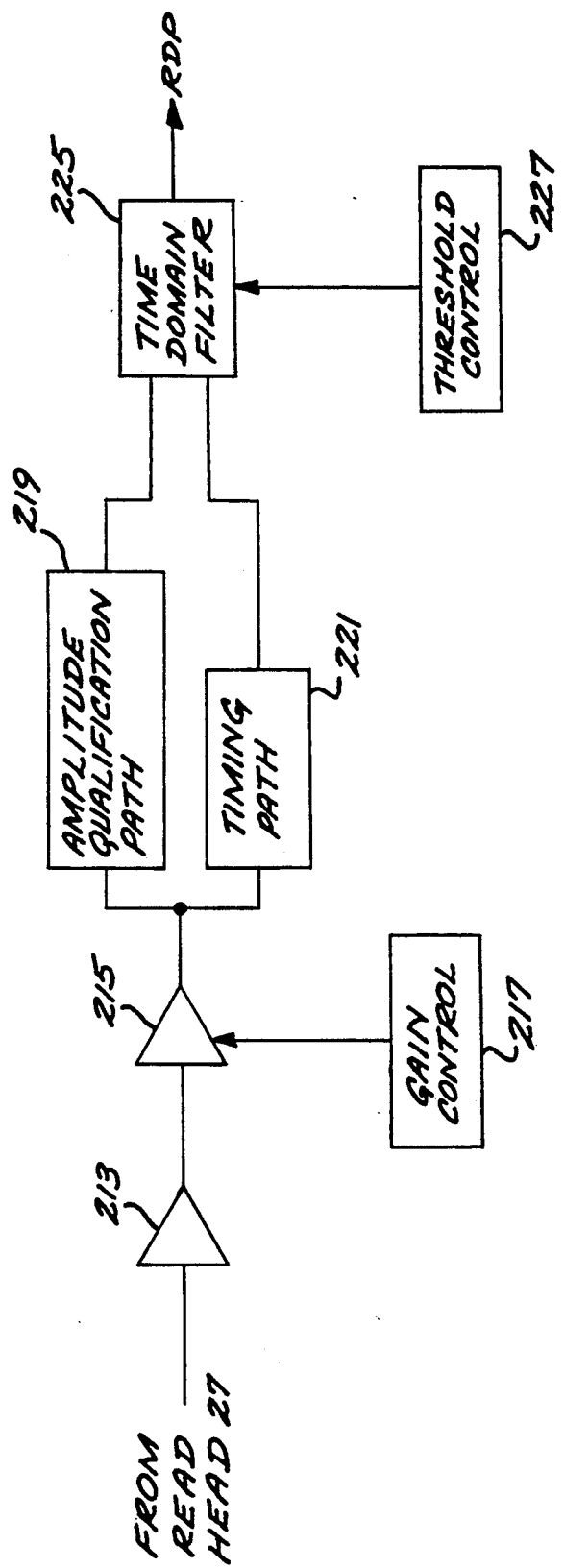
FIG. 5 is a schematic block diagram of a tape read circuit which can be utilized with the calibration circuit of FIG. 4.

Referring now to FIG. 5, set forth therein is a block diagram of a read circuit with which the calibration circuit can be utilized. The output of the read head 27 (FIG. 1) is amplified by a preamplifier 213 and a variable gain amplifier 215 whose gain is controlled by a gain control circuit 217. The output of the variable gain amplifier 215 is directed to two parallel channels: an amplitude qualification channel 219 and a timing channel 221. The amplitude qualification signal and the timing signal provided by the two channels are provided in parallel to a time domain filter 225 which has a variable threshold that is controlled by a threshold control circuit 227. The time domain filter provides an output signal RDP which contains pulses representative of each of the "1" transitions read by the read head 27.

The timing channel 221 differentiates the output of the variable gain amplifier 215 and provides a trigger to the time domain filter 225 corresponding to the transitions in the read data stream with additional pulses created in the middle of long strings of zeroes in the read data stream. The amplitude qualification channel 219 integrates the output of the variable gain amplifier 215 and provides a signal which is used by the time domain filter 225 to distinguish between (a) transitions that correspond to the NRZI ones and (b) transitions added by the timing channel.

As is known, the time domain filter essentially detects when the timing input crosses zero, delays a predetermined amount, and then examines the amplitude qualification signal as to whether or not it has exceeded one of two threshold levels that are on either side of a reference by equal amounts. Such threshold levels can be considered as a positive threshold and a negative threshold, and an RDP pulse is produced only under the following conditions:

(a) the amplitude qualification signal increases so as to cross the positive threshold and is above the threshold at a predetermined time after the timing path signal has crossed 0 in the positive direction, and the prior RDP pulse was produced by the amplitude qualification signal exceeding the negative threshold as described in condition (b); or (b) the amplitude qualification signal decreases so as to cross the negative threshold and is below the threshold for at a predetermined time after the timing path signal has crossed 0 in the negative direction, and the prior RDP pulse was produced by the amplitude qualification signal exceeding the positive threshold as described in condition (a).

Figure 6:
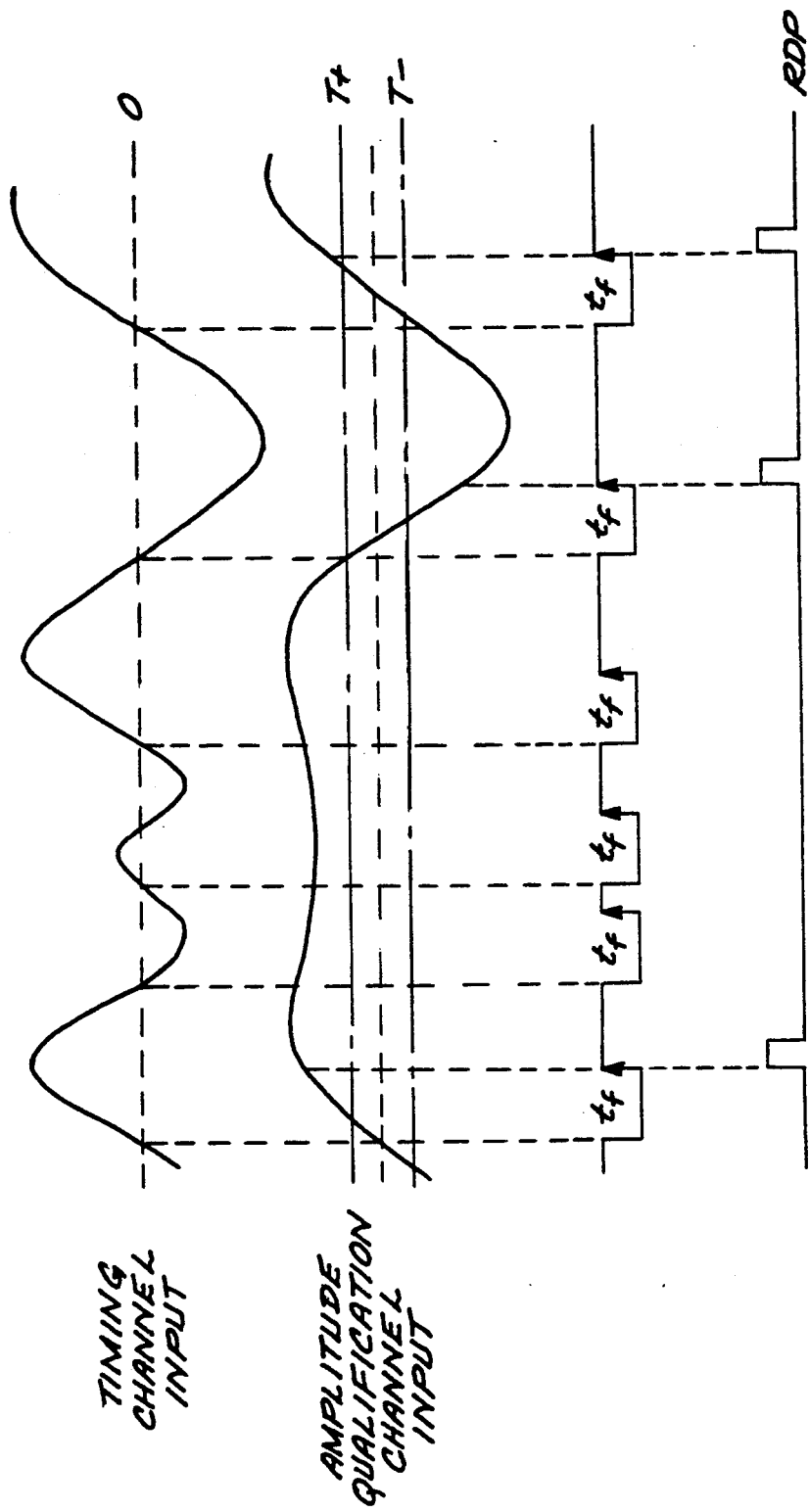
FIG. 6 schematically depicts the inputs to the time domain filter of the tape read circuit of FIG. 5 and is helpful in understanding the operation of the time domain filter.

FIG. 6 sets forth waveforms that represent the timing channel and amplitude qualification inputs to the time domain filter, and the generation of the RDP pulses pursuant to the amplitude and polarity of the amplitude qualification signal after a predetermined time interval $t_f$ following a zero crossing by the timing signal. It is noted that a zero crossing of the timing signal that occurs prior to when the predetermined time elapses for a preceding zero crossing is ignored.

Figure 7:
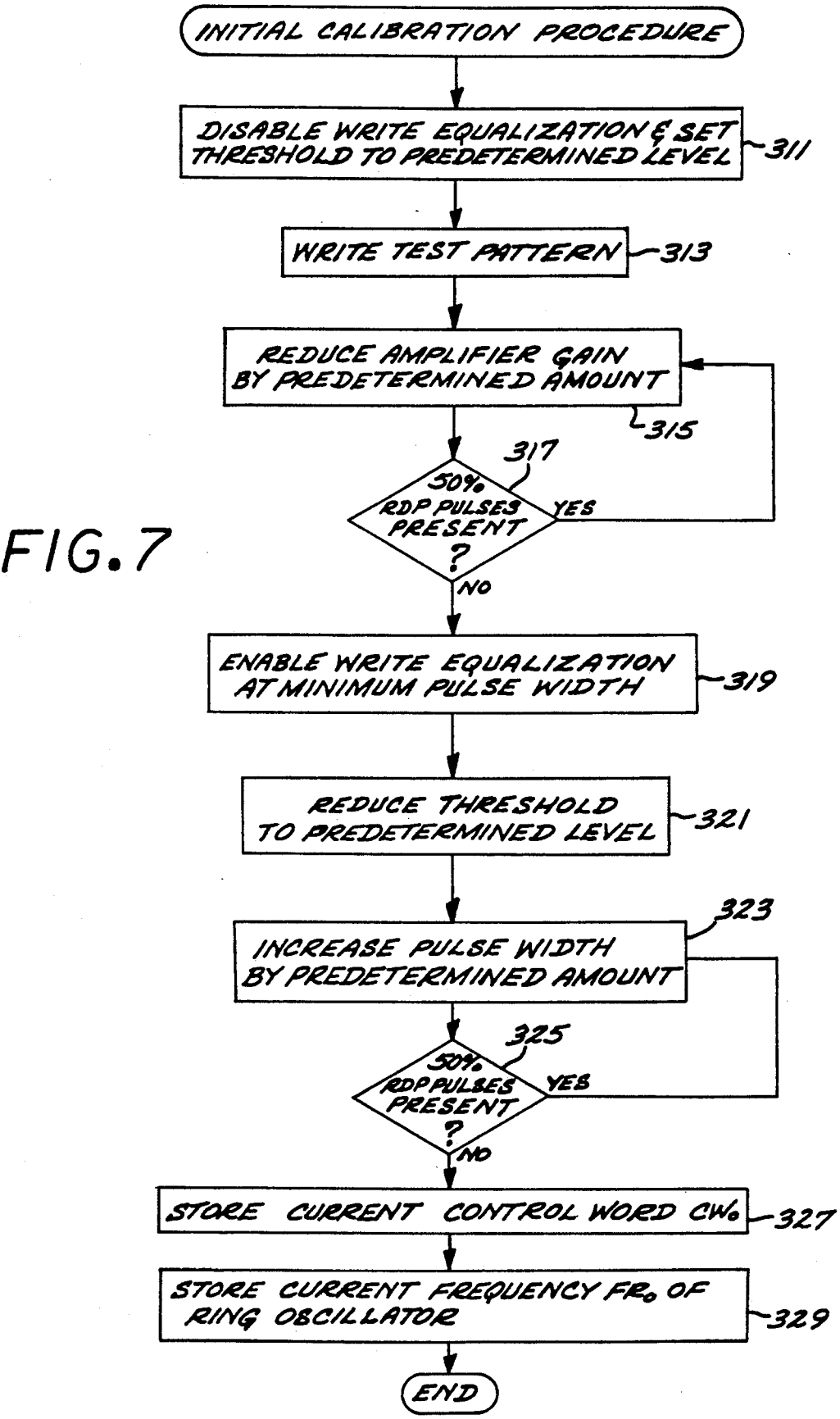
FIG. 7 is a flow diagram of a calibration process performed by the calibration circuit of FIG. 4.

Referring now to FIG. 7, set forth therein is a flow diagram of a calibration procedure performed by the processor of the calibration circuit for determining the control reference value $CW_o$ and the reference frequency $FR_o$ for achieving a desired suppression of the read signal. At 311 write equalization is disabled and the read threshold of the time domain filter is set to a predetermined level that for the particular implementation is considered to be optimum. For normalization purposes, that predetermined level is regarded as 100%. At 313 a repeating test pattern is written to tape, comprising for example the maximum number of 0's allowed by the particular RLL code and intervening 1's, which would produce the lowest fundamental frequency. The RDP pulses would occur at lowest fundamental frequency, and at 315 the gain of the amplifier 315 is reduced by a predetermined amount. At 317 a determination is made as to the number of RDP pulses being produced is 50% or more of the RDP pulses that would normally be produced pursuant to the test pattern on tape. If yes, the gain is again adjusted at 315. If no, the number of RDP pulses is not 50% or more of the RDP pulses that would normally be produced, the procedure transfers to 319. Essentially, the gain of the amplifier is reduced incrementally to slightly below the gain level that produces 50% of the RDP pulses that would normally be produced.

At 319 write equalization is enabled with the equalization pulses set at minimum width (i.e., no pulse stretching), and at 321 the threshold of the time domain filter is reduced to a predetermined level that corresponds to the desired suppression relative to 100%, which will cause all of the RDP pulses to be produced. At 323 the control width of the write equalization pulses is increased by increasing the control word by a predetermined amount. At 325 a determination is made as to whether the number of RDP pulses being produced is 50% or more of the RDP pulses that would normally be produced pursuant to the test pattern on tape. If no, the number of RDP pulses is not 50% or more of the RDP pulses that would normally be produced, at 327 the current control word is stored as the reference control word $EQ_o$. At 329 the current frequency output of the ring oscillator is stored as the reference frequency $FR_o$. Essentially, the write equalization pulse width is increased to the width that is slightly greater than the minimum pulse width which would produce 50% of the RDP pulses for the predetermined time domain filter threshold set previously, and the control word associated with that increased width is utilized as the reference control word.

It should be appreciated that while 50% is utilized as the threshold in the foregoing for setting amplifier gain and time domain threshold, some other amount can be utilized.

After the initial calibration is completed, data can be written to tape and the calibration circuit adjusts the control word CW pursuant to the following equation:

$$CW = CW_o \cdot (FR/FR_o) \quad \text{(Equation 9)}$$

where the control word reference value $CW_o$ and the reference frequency $FR_o$ are determined as described above.

The foregoing equation for maintaining the equalization pulse width constant is based on the following. From Equation 8 above, the reference frequency $FR_o$ is related to the reference value $K_o$ (which was the value of K when the reference frequency was determined) as follows:

$$FR_o = FR_{(nom)}/K_o \quad \text{(Equation 10)}$$

The width EQP_WIDTH of the EQP pulses includes the width EQN_WIDTH of the EQN pulses provided by the equalization timing circuit 13 and the delay provided by the multiple stage delay circuit as expressed in Equation 3 above:

$$EQP\_WIDTH = EQN\_WIDTH + CW \cdot d_{nom} \cdot K \quad \text{(Equation 11)}$$

The desired equalization pulse $EQ\_WIDTH_o$ determined pursuant to calibration is therefore:

$$EQP\_WIDTH_o = EQN\_WIDTH + CW \cdot d_{nom} \cdot K_o \quad \text{(Equation 12)}$$

Since $EQP\_WIDTH_o$ is the width to be maintained, the right sides of Equations 11 and 12 can be equated to provide:

$$CW \cdot d_{nom} \cdot K = CW_o \cdot d_{nom} \cdot K_o \quad \text{(Equation 13)}$$

$$CW = CW_o(K_o/K) \quad \text{(Equation 14)}$$

From Equations 8 and 10, $(K_o/K)$ can be expressed as $(FR/FR_o)$ to provide the following which is Equation 9 above for maintaining the width of the equalization pulses EQP:

$$CW = CW_o \cdot (FR/FR_o)$$

By way of illustrative example, the control word CW is updated just prior to every time the write head is enabled.

Pursuant to the operation of the calibration circuit, processing variations are compensated by the initial calibration which also compensates for write head variations, and voltage and temperature effects are compensated by the steady state calibration which is performed relative to the references provided by the initial calibration.

Figure 8:
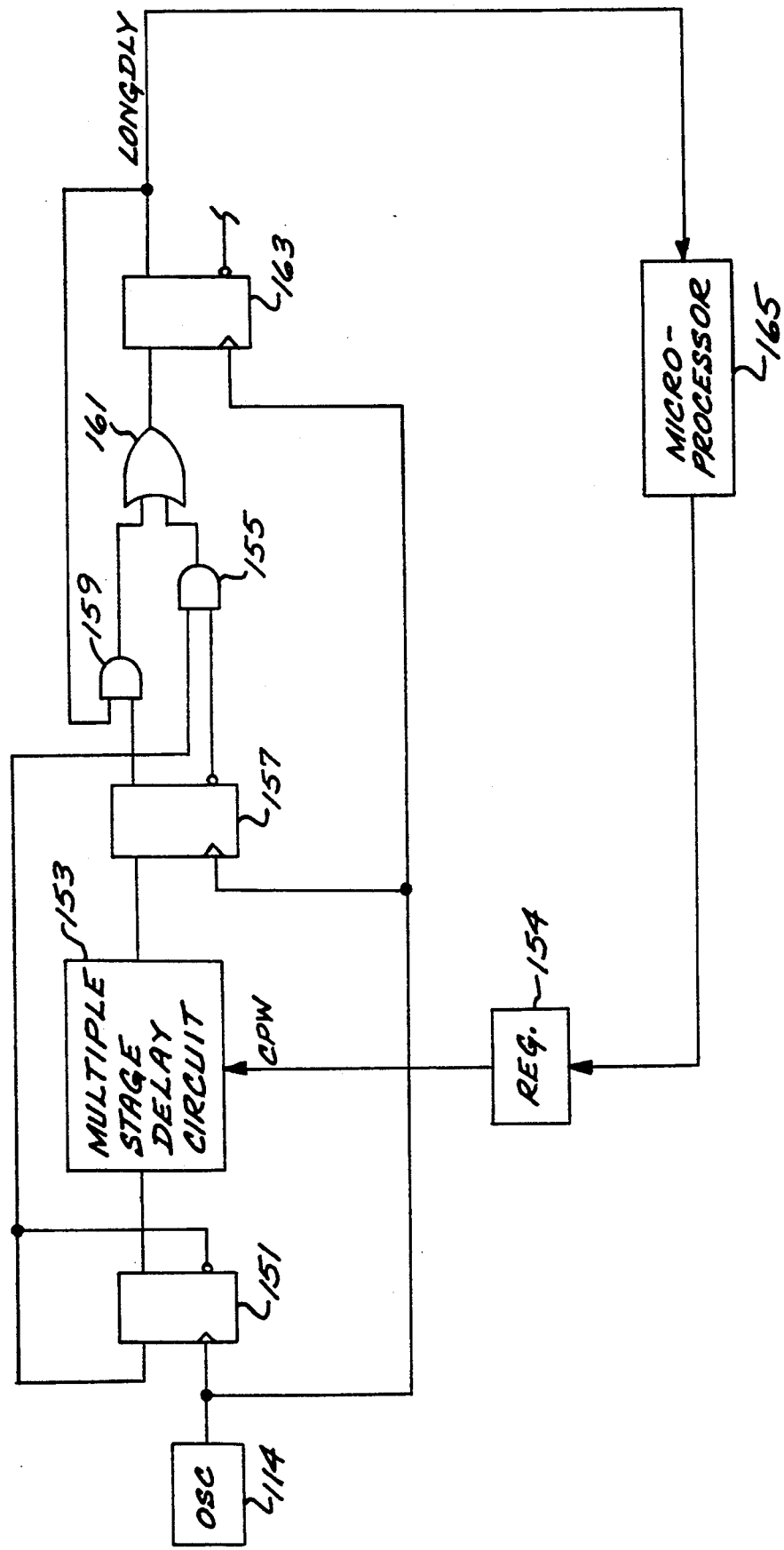
FIG. 8 is a schematic block diagram of a further illustrative example of an implementation of the calibration circuit of the write equalization circuit of FIG. 1.

Referring now to FIG. 8, set forth therein is a block diagram a further example of an implementation of the calibration circuit 23 which includes components that are implemented in the same integrated circuit as the multiple stage delay circuit 15 of the equalization circuit of FIG. 1, as discussed more fully herein. The calibration circuit of FIG. 8 includes a flip-flop 151 which is clocked by a crystal oscillator clock source 114 that can comprise the crystal oscillator 14 in FIG. 1. The positive output of the flip-flop 151 is provided to a multiple stage delay circuit 153 which is similar to the multiple stage delay circuit 15 in FIG. 1, but with a longer total delay such that under reasonable conditions of process, temperature, and voltage, it will be capable of providing a delay that is at least one period of the clock output of the oscillator 114. The number of stages enabled in the multiple stage delay circuit 153 is controlled by the contents of a control register 154.

The negated output of the flip-flop 151 is fed back into the input of the flip-flop 151 and is further provided as one input to a two-input AND gate 155. The other input to the AND gate 155 is provided by the negated output of a flip-flop 157 which is clocked by the oscillator 114 and whose input is provided by the multiple stage delay circuit 153. The positive output of the flip-flop 157 provides an input to a two-input AND gate 159 whose output is provided as an input to an OR gate 161 which also receives an input from the AND gate 155. The output of the OR gate 161 provides the input for a flip-flop 163 which is clocked by the oscillator 114. The LONGDLY output of the flip-flop 163 is provided to a microprocessor 165 which adjusts the contents of the calibration circuit control register 154 and like the microprocessor 117 in FIG. 4 is configured to communicate with the read circuit 25 and the equalization circuit control register 17.

The flip-flop 151, the multiple stage delay circuit 153, the AND gate 155, the flip-flop 157, the AND gate 159, the OR gate 161, and the flip flop 163 are implemented in the same integrated circuit as the multiple stage delay circuit 15 of the equalization circuit of FIG. 1.

The LONGDLY output of the flip-flop 163 is HI when the delay provided by the multiple stage delay circuit 153 is greater than one period of the clock output of the oscillator 114, and is LO when the delay provided by the multiple is less that such clock period. The propagation delay characteristics of the logic gates in the multiple stage delay circuit 153 can be detected by determining the smallest value that causes the LONGDLY signal to be HI, and such value is utilized by the microprocessor 165 for calibration procedure discussed above and for adjusting the control word CW of the write equalization circuit of FIG. 1. In this manner, the number of stages required for a fixed delay is determined, and that number of stages can vary with temperature and voltage.

For the calibration procedure, the procedure of FIG. 7 is followed, except that a calibration circuit reference control word $CPW_o$ is determined instead of a reference frequency. In particular, after the equalization circuit reference control word $CW_o$ is stored at 327, the calibration circuit reference control word $CPW_o$ is determined by adjusting the control word CPW to the smallest value that causes LONGDLY to be HI, and that value of CPW is stored as $CPW_o$.

For steady state operation, the equalization circuit control word CW is adjusted by the microprocessor 165 in accordance with the following equation pursuant to changes in the smallest value of CPW that caused LONGDLY to be HI:

$$CW = CW_o \cdot (CPW/CPW_o) \quad \text{(Equation 15)}$$

The foregoing equation is based on the same analysis as utilized above for Equation 9 which is utilized with the calibration circuit of FIG. 3 to adjust the equalization circuit control word CW pursuant to changes in the frequency of operation of the ring oscillator of the calibration circuit of FIG. 3.

Essentially, the calibration circuit of FIG. 8 indirectly detects changes in the propagaation delay characteristics of the equalization circuit multiple stage delay circuit 15 by directly detecting changes in the propagation delay characteristics of the calibration circuit multiple stage delay circuit 153 as manifested by change in the smallest value of the control word CPW that will cause LONGDLY to be HI.

Since the calibration circuit of FIG. 8 includes a multiple stage delay circuit, a single multiple stage delay circuit can be utilized in the write equalization circuit of FIG. 1 as implemented with calibration circuit of FIG. 8. The single multiple stage delay circuit would provide, pursuant to appropriate multiplexing circuitry at its input and output and appropriate control of the contents of its control word, the respective functions of (a) equalization pulse width control and (b) detection of propagation delay characteristics.

Although the foregoing has been a description and illustration of specific embodiments of the invention, various modifications and changes thereto can be made by persons skilled in the art without departing from the scope and spirit of the invention as defined by the following claims.

What is claimed is:

1. A write circuit for a computer data tape drive, comprising:
    data means for producing a binary data signal wherein a 1 is represented by a transition at the start of a respective bit interval and a 0 is represented by no transition at the start of said respective bit interval;
    equalization means for producing equalization pulses for predetermined 0's in said binary data signal, said equalization pulses having a controllable width;
    calibration means for controlling the width of said equalization pulses so as to achieve a desired equalization and for maintaining said width substantially constant; and
    means for combining said binary data signal and said equalization pulses to produce a composite write data signal representative of information to be written to tape.

2. The write circuit of claim 1 wherein said equalization means includes:
    pulse generating means for generating nominal equalization pulses;
    multiple stage delay means having logic gates implemented in an integrated circuit and responsive to said nominal equalization pulses and a control word from said calibration means for providing delayed equalization pulses, wherein the number of stages employed for delay is determined by the control word; and
    an OR circuit for logically ORing said nominal equalization pulses with said delayed equalization pulses to reduce said equalization pulses; and wherein said calibration means includes:
    detecting means implemented in the same integrated circuit as said multiple stage delay means for detecting changes in the propagation delay characteristics of the logic gates of said multiple stage delay means; and
    processing means responsive to said detecting means for adjusting said control word so as to maintain said width of said equalization pulses substantially constant.

3. The write circuit of claim 2 wherein said detecting means comprises oscillating means providing an output frequency that varies with operating voltage and operating temperature.

4. The write circuit of claim 3 wherein said oscillating means comprises a ring oscillator having a delay circuit that includes logic gates.

5. The write circuit of claim 2 wherein said detecting means comprises:
    second multiple stage delay means having logic gates implemented in the same integrated circuit as said multiple stage delay means and responsive to a detecting means control word, wherein the number of stages employed for delay is determined by said detecting means control word; and
    logic means implemented in the same integrated circuit as said second multiple stage delay means for providing an indication of whether the delay provided by said second multiple delay means is less than or greater than a predetermined time reference;
    said processing means adjusting said detecting means control word so that the delay provided by said second multiple stage delay means is at a substantially constant relation to said predetermined time reference, whereby said detecting means control word as adjusted is indicative of the propagation delay characteristics of said multiple stage delay means and is utilized to adjust the control word for said multiple stage delay means.

6. A write circuit for a computer data tape drive, comprising:
    data means for producing a binary data signal wherein a 1 is represented by a respective transition at the start of a bit interval and a 0 is represented by no transition at the start of said respective bit interval;
    pulse generating means for generating nominal equalization pulses for predetermined 0's in said binary data signal;
    multiple stage delay means having logic gates implemented in an integrated circuit and responsive to said nominal equalization pulses and a control signal for providing delayed equalization pulses, wherein the number of stages employed for delay is determined by the control signal;
    an OR circuit for logically ORing said nominal equalization pulses with said delayed equalization pulses to produce controlled equalization pulses;
    oscillating means implemented in the same integrated circuit as said delay means, said oscillating means providing an output frequency that varies with operating voltage and operating temperature; and
    processing means responsive to said output frequency for adjusting the control signal to be equal to $CW_o*(FR/FR_o)$, where FR is the output frequency of said oscillating means, $CW_o$ is a control signal reference, and $FR_o$ is a frequency reference.

7. The write circuit of claim 6 wherein said oscillating means comprises a ring oscillator having a delay circuit comprising logic gates.

8. A write circuit for a computer data tape drive, comprising:
    data means for producing a binary data signal wherein a 1 is represented by a transition at the start of a respective bit interval and a 0 is represented by no transition at the start of said respective bit interval;
    pulse generating means for generating a start signal indicative of the initial edges of equalization pulses for predetermined 0's in said binary data signal;
    delay means having logic gates implemented in an integrated circuit and responsive to said start signal and a control word for providing equalization pulses, wherein the number of stages employed for delay is determined by the control word;

detecting means implemented in the same integrated circuit as said stage delay means for detecting changes in the propagation delay characteristics of the logic gates of said delay means; and processing means responsive to said detecting means for adjusting said control word so as to maintain the width of said equalization pulses substantially constant.

9. The write circuit of claim 8 wherein said detecting means comprises oscillating means providing an output frequency that varies with operating voltage and operating temperature.

10. The write circuit of claim 9 wherein said oscillating means comprises a ring oscillator having a delay circuit that includes logic gates.

11. The write circuit of claim 8 wherein said detecting means comprises:

second multiple stage delay means having logic gates implemented in the same integrated circuit as said delay means and responsive to a detecting means control word, wherein the number of stages employed for delay is determined by said detecting means control word; and logic means implemented in the same integrated circuit as said second delay means for providing an indication of whether the delay provided by said second delay means is less than or greater than a predetermined time reference;

said processing means adjusting said detecting means control word so that the delay provided by said second delay means is at a substantially constant relative to said predetermined time reference, whereby said detecting means control word as adjusted is indicative of the propagation delay characteristics of said delay means and is utilized to adjust the control word for said delay means.

12. A pulse circuit for producing pulses having substantially constant pulse width, comprising:

pulse generating means for generating initial pulses;

multiple stage delay means implemented in an integrated circuit responsive to said initial pulses and a control signal for providing delayed pulses, wherein the number of stages employed for delay is determined by the control signal;

oscillating means implemented in the same integrated circuit as said delay means having an output frequency that varies with operating voltage and operating temperature;

processing means responsive to said output frequency for adjusting the control signal as a function of said output frequency; and an OR circuit for logically ORing said initial pulses with said delayed pulses to produce output pulses.

13. A method for adjusting write equalization pulses in a tape drive that includes (i) an equalization pulse generating circuit having a variable delay circuit that includes logic gates, (ii) a read amplifier, and (iii) a read circuit time domain filter, comprising the steps of:

setting the threshold of the time domain filter at a predetermined level;

writing a predetermined Run Length Limited (RLL) coded test pattern containing 1's separated by successive 0's without equalization pulses;

reading the recorded test pattern and reducing the gain of the read amplifier to a level that is slightly below the minimum amplifier gain level at which the time domain filter would detect a predetermined percentage of the recorded 1's, such percentage being less than 100%;

writing the predetermined RLL test pattern with equalization pulses having a predetermined pulse width;

reducing the threshold of the time domain filter by a predetermined amount; and increasing the pulse width of the equalization pulses to a reference width slightly greater than the minimum pulse width which would cause detection of the predetermined percentage of the recorded 1's.

14. The method of claim 13 further including the steps of:

detecting changes in the propagation delay characteristics of the delay circuit of the equalization circuitry; and controlling the equalization circuit so as to maintain the equalization pulse width at the reference width.

* * * * *

UNITED STATES PATENT AND TRADEMARK OFFICE
CERTIFICATE OF CORRECTION

PATENT NO. : 5,255,130
DATED : October 19, 1993
INVENTOR(S) : William A. Buchan et al.

It is certified that error appears in the above-indentified patent and that said Letters Patent is hereby corrected as shown below:

```
Column 3, line 2, "13 s" should be --1's--.
Column 4, line 38, "Where" should be --where--.
Column 5, line 61, after "111" insert a period --.--.
Column 6, line 25, "Where" should be --where--.
Column 10, line 62, "propagaation" should be --propagation--.
Column 11, line 51, "reduce" should be --produce--.
Column 11, line 51, after "pulses;" start a new paragraph.
Column 13, line 34, "relative" should be --relation--.
Column 14, line 42, "circuit" should be --circuitry--.
```

Signed and Sealed this

Sixteenth Day of July, 1996

Attest:

BRUCE LEHMAN

*Attesting Officer*     Commissioner of Patents and Trademarks